United States Patent Office 3,836,465
Patented Sept. 17, 1974

3,836,465
COMPOSITION USEFUL AS A FLUID LOSS CONTROL AGENT
John S. Rhudy and John A. Davis, Jr., Littleton, Colo., assignors to Marathon Oil Company, Findlay, Ohio
No Drawing. Continuation-in-part of application Ser. No. 257,127, May 26, 1972, now Patent No. 3,747,681.
This application Apr. 26, 1973, Ser. No. 354,602
Int. Cl. C10m 3/22, 3/34
U.S. Cl. 252—8.5 C                    7 Claims

ABSTRACT OF THE DISCLOSURE

A composition particularly useful as a fluid loss control agent in drilling fluids and as a diverting agent in subterranean strata is obtained by forming an aqueous solution comprised of about 0.005–10% by weight of a high molecular weight polyalkylene oxide polymer (preferably polyethylene oxide polymer having a MW of 100,000–10,000,000) and about 0.005–10% by weight of a natural resin, e.g. sodium or calcium lignosulfate. This aqueous solution is highly viscoelastic, i.e., it is a fluid when not agitated but exhibits a gel-like characteristic upon agitation.

CROSS REFERENCE TO RELATED APPLICATIONS

This is a continuation-in-part of our copending patent application identified as Ser. No. 257,127, filed May 26, 1972, now Pat. No. 3,747,681.

BACKGROUND OF THE INVENTION

Field of the Invention

A composition having particular properties useful as a fluid loss control agent and/or diverting agent in the oil industry is obtained with a composition comprised of a high molecular weight polyalkylene oxide and a natural resin, e.g. sodium or calcium lignosulfonate.

Description of the Prior Art

Excessive fluid loss from drilling fluids can cause severe problems. For example, filter cake build-up can become so thick that the drill pipe may become stuck; also there may be great difficulty in withdrawing pipe from the hole. In some cases, return circulation of drilling fluids can be completely lost. Also, high water losses can cause sloughing and caving in of shale formations. In addition, electrical logging of the well can be adversely influenced due to the mud filtrates, etc.

Examples of water loss control agents that have been used include bentonite, pregelatinized starch, carboxymethyl cellulose, polyacrylates, gums, emulsified oil, high molecular weight polymers, etc.

Examples of patents which teach the use of fluid loss control agents include:

U.S. 3,516,496 to Barkman et al. teaches a liquid suspension of polyethylene oxide, micro-particles of calcium carbonate and a wetting agent as a temporary plugging composition.

U.S. 3,053,675 to Rehmar et al. teaches a gel-forming composition useful in oil wells, the gel comprised of sodium lignin sulfonate, a hexavalent chromium salt and a reducing salt.

U.S. 3,022,248 to Anderson et al. discloses a fluid loss agent comprised of a dispersion of alkaline and acid forms of lignin.

U.S. 2,898,294 discloses a completion fluid having low fluid loss property, the fluid composed of water, an oily phase, a wetting agent, and an emulsifying agent which consists of sodium lignosulfonate and a tall oil ester of polyalkylene or polyoxyethylene sorbitol.

U.S. 3,022,249 to Eberhard discloses a fluid loss agent composed of soya flour and sodium lignosulfonate.

U.S. 3,065,172 to Groves et al. discloses a fluid loss agent composed of a finely divided oil-insoluble material, an oil carrier, an agglutinous dispersant which can be polyethylene oxide derivatives of alcohol, fatty acids, amines, amides, and phenols.

While injecting fluids into subterranean strata, diverting agents are desired where a highly permeable zone or a "thieving" zone is encountered. The diverting agent tends to "block" the more permeable zones to prevent thieving of the injected fluids and to permit better utilization of the injected fluids. The "blockage" must be susceptible to physical and/or chemical degradation to "break down" the "blockage" and permit fluid to flow through the reservoir rock.

Applicants have discovered a particular composition which has attractive properties as a fluid loss control agent, a diverting agent and for similar purposes.

SUMMARY OF THE INVENTION

Applicants' composition is an aqueous solution comprised of a high molecular weight polyalkylene oxide polymer and a natural resin, e.g. sodium lignosulfonate. This aqueous solution is highly viscoelastic. Also, it can be easily chemically degraded to restore permeability of a reservoir rock that is treated with the composition.

PREFERRED EMBODIMENTS OF THE INVENTION

The aqueous solution is comprised of about 0.005 to about 10% and preferably about 0.01 to about 1% and more preferably about 0.1 to about 0.3% of a polyalkylene oxide polymer and about 0.005 to about 10% and preferably about 0.025% to about 1% and more preferably about 0.2% to about 0.4% of a natural resin, the percents based on weight. Of course, other components desired within the driling fluid, diverting fluid, or other fluids containing the composition, are intended to be incorporated wthin the aqueous solution. For example, it is well known that wetting agents, organic materials to impart olephilic properties to the drilling fluid, agents to increase suspension properties of the drilling fluid, additional fluid loss control agents, etc. may be incorporated within the fluids. The numerous compositions and components that can be incorporated into the fluids are not herein defined since it is known to the prior art.

The term "polyalkylene oxide polymer" as used herein is meant to include high molecular weight polyethylene oxides, polypropylene oxides, and polbutylene oxides, etc. These polyalkylene oxides can be chemically modified, desirably to obtain improved results, and the chemically modified polyalkylene oxide polymers are intended to be included within the scope of this invention. The molecular weight of the polyalkylene oxide polymers is about 10,000 to 10,000,000 or more and preferably about 600,000 to about 7,500,000 and more preferably about 4,000,000 to about 6,000,000. Lower or higher molecular weight polymers may be desired for particular purposes; but, the above ranges should be suited for most applications. The preferred polyalkylene oxide polymer is commercially available from Union Carbide Company, 270 Park Ave., New York, N.Y., 10017, U.S.A. under the trademark "Polyox Coagulant" and "Polyox WSR 301."

The term "natural resin" as used herein is meant to include any unmodified resin, e.g. a copal, or a dammar, from a natural source, such as a tree, or a modified resin from such source, e.g. tannic acid, all of the lignosulfonates. Preferably the natural resin is a calcium or sodium lignosulfonate. Examples of natural resins useful with this invention can be found in *Encyclopedia of Polymer Science and Technology*, John Wiley & Sons, Inc. 1970, Vol. 12, pp. 90–102.

The aqueous solutions containing the high molecular weight polyalkylene oxide polymer and the natural resin are highly viscoelastic. They are fluid when agitated gently, but will set up to a gel-like consistency when agitated more rapidly. On standing for several minutes, the gel-like mass begins to revert to a more fluid state, ultimately reverting to the same state as that observed before agitation. These aqueous solutions can be classified as "shear thickening agents," i.e. they exhibit an increase in viscosity with an increase in shear rate.

The water used as the aqueous medium in the solution can be soft water, brackish water or a brine water. Preferably the water is soft. Where the water does contain ions, it is preferred that the ions are compatible with the environment in which the aqueous solution is to be used.

Additives such as oxidation and corrosion inhibitors, bactericides, etc. may be added to the aqueous solution. Generally speaking, any additives may be admixed with the aqueous solution as long as it is compatible with the polyalkylene oxide and the natural resin, i.e. the chemical additives do not substantially chemically degrade the components.

Use of drilling fluids and diverting agents in subterranean reservoirs are known in the art. It is assumed that this prior art knowledge is to be incorporated within the teaching of this invention. That is, particular volume amounts of the aqueous solution as well as flow rates, pressures, etc. of using the aqueous solution in the reservoir is assumed. Particular applications and uses of the compositions of this invention can be equated to similar uses for water-based drilling fluids.

It is desired that when the aqueous solution is used as a diverting agent, that the formation treated with the solution be restored to its original permeability. This can be accomplished by injecting behind the aqueous solution a chemical to chemically degrade the composition of these polymers. Examples of such chemicals include aqueous solutions containing about 0.25 to about 10% sodium hypochlorite, about 0.01 to about 10% of polyamine, e.g. hydrazine, about 1 to about 15% of HCl, etc. Also, natural means, within the reservoir, i.e. time, temperature, pressure, formation fluids, etc. degrade the polymer and restore the formation to its original permeability. This is especially desirable where it is desired to divert the flow of fluids into less permeable zones during an injection sequence and thereafter restore the original permeability of the zone treated with the diverting agent.

EXAMPLES

A sandstone core 1" in diameter by 2¾" in length is first cleaned and dried. The core samples have pressure taps located at 0.78" and 2.74" from the front section of the sample. Thus, the core sample is divided into two sections, an upstream or front section and a rear section. The core sample is then flooded with the following Table I-indicated PV (pore volume) in the following sequence:

(1) water to determine initial front and rear section permeabilities;
(2) aqueous solution containing polyethylene oxide polymer and sodium lignosulfonate;
(3) water to determine fluish permeabilities of both rear and front sections of the core;
(4) aqueous solution containing about 3% of sodium hypochlorite to chemically degrade the polymer complex of "(2)"; and
(5) water to determine second flushed permeabilities of the front and rear sections of the core sample.

Data from this flooding is reported in Tables I and II. In Table I, the polymer complex contains about 0.18% by weight of polyethylene oxide polymer having an average molecular weight of about 5,000,000 and 0.27% by weight of calcium lignosulfonate. The aqueous solution containing the polymer complex has a viscosity of 8.5 cps. at 25° C. (determined on a Brookfield viscometer at 6 r.p.m.) and a "screen factor" of 67.6. Screen factor is defined in *American Institute of Mining, Metallurgical and Petroleum Engineers, Inc.*, paper No. SPE 2867, "Factors Influencing Mobility Control by Polymer Solution," copyright 1970. When this particular aqueous polymer complex solution is agitated rapidly, it sets up as a gel.

The polymer complex used in Table II contains 0.095% by weight of polyethylene oxide polymer (Polyox Coagulant polymer), having an average molecular weight of about 5,000,000, and 0.14% by weight of calcium lignosulfonate (identified by the trademark Airecon polymer, the trademark owned by Union Carbide Company, 270 Park Avenue, New York, N.Y., 1017, U.S.A.). The solution has a viscosity of about 62 cps. at 25° C. determined on a Brookfield viscometer at 6 r.p.m. Deionized water is used in the core flooding:

TABLE I

| | Front section | | Rear section | |
|---|---|---|---|---|
| | Permeability, md. | Relative mobility | Permeability, md. | Relative mobility |
| Initial water (9.6 PV) | 95.9 | 1.0 | 102.3 | 1.0 |
| Polymer complex (after 4 PV) | | [1] 0.000104 | | [1] .256 |
| First water flush (8 PV) | 0.36 | 0.00376 | 38.8 | .379 |
| Hypochlorite flush (0.5 PV) | | | | |
| Second water flush (8.6 PV) | 26.0 | 0.272 | 97.3 | 0.952 |

[1] At 1 ft./day.

The above Table I shows that there is a very low relative mobility across the front section, a decrease from water mobility by a factor of about 10,000, compared to a much smaller decrease in the second section (a factor of about 4). The aqueous polymer solution acts as a very effective plugging agent for a short distance giving very high differential pressures in that short distance. This is very desirable as a drilling fluid to prevent fluid loss from the drilling fluid, that is, the former complex prevents bleed-off of liquids within the drilling fluid.

As the data in Table I shows, injection of a sodium hypochlorite (concentration of 2.7%) is useful to eliminate residual effects from the polymer complex. That is, the permeability of the second section is restored to 95% of its original value.

Table II data is obtained using a polymer complex different from that in Table I and earlier. These data are:

TABLE II

| | Front section | | Rear section | |
|---|---|---|---|---|
| | Permeability, md. | Relative mobility | Permeability, md. | Relative mobility |
| Initial water (16.6 PV) | 251 | 1.0 | 326 | 1.0 |
| Polymer complex (after 5.3 PV) | | [1] 0.000051 | | [1] 0.1 |
| First water flush (after 7 PV) | 0.17 | 0.00068 | 72.1 | 0.22 |
| Hypochlorite flush (1.1 PV) | | | | |
| Second water flush (after 8 PV) | 44.8 | 0.178 | 232 | 0.71 |

[1] At 2 ft./day.

As the data in Table II indicate, the mobilities are extremely low across the front section of the core sample during injection, i.e. a decrease from water mobility by a factor of almost 20,000. The polymer complex blocks the core face and thus allows very little water penetration—note the extremely low relative mobility of the first water floods. Relative mobilities are only slightly less than 1 in the rear core section, thus this fluid is very effective blocking agent for short distances, giving very high differential pressures for fluid penetration across short distances. After the polymer complex flows for a short distance, its structure appears to break down and then becomes much more mobile. Such a phenomenon is a desirable property for a diverting agent since the material does not penetrate into the rock matrix and does not cause significant contamination of the matrix.

The data in Table II also show that the polymer is substantially degraded by the sodium hypochlorite solution, the solution at a concentration of 3% by weight. That is, the relative mobility to water was greatly increased by the sodium hypochlorite flush. The restoration of fluid injectivity or productivity is a desirable property for a temporary diverting agent.

This invention is not intended to be limited by the foregoing specific examples. Rather, all modifications and equivalents obvious to those skilled in the art are intended to be included within the scope of the invention as defined within the specification and appended claims.

What is claimed is:

1. An aqueous viscoelastic composition particularly applicable as a fluid loss control agent in drilling fluids and as a diverting agent to substantially divert fluids during the injection of fluids in a well in fluid communication with a subterranean reservoir comprising an aqueous solution of about 0.005 to about 10% by weight of a polyalkylene oxide polymer selected from the group consisting of polyethylene oxide, polypropylene oxide and polybutylene oxide having an average molecular weight of about 10,000 to about 10,000,000, and about 0.005 to about 10% by weight of a natural resin selected from the group consisting of lignosulfonates an tannic acid.

2. The composition of Claim 1 wherein the aqueous polymer solution contains about 0.01 to about 1% by weight of a polyethylene oxide polymer and about 0.025 to about 1% by weight of the natural resin.

3. The composition of Claim 1 wherein the natural resin is sodium lignosulfonate.

4. The composition of Claim 1 wherein the natural resin is calcium lignosulfonate.

5. The composition of Claim 1 wherein the polyalkylene oxide has an average molecular weight within the range of about 500,000 to about 10,000,000.

6. The composition of Claim 1 wherein the natural resin is sodium lignosulfonate and/or calcium lignosulfonate.

7. The composition of Claim 1 wherein the aqueous solution contains a polyethylene oxide polymer having an average molecular weight of at least about 500,000 and sodium lignosulfonate or calcium lignosulfonate.

References Cited
UNITED STATES PATENTS

| | | | |
|---|---|---|---|
| 3,746,094 | 7/1973 | Norton et al. | 166—275 |
| 2,731,414 | 1/1956 | Binder et al. | 252—8.55 |
| 3,458,442 | 7/1969 | Floyd et al. | 137—13 X |
| 3,254,719 | 6/1966 | Root | 166—308 |
| 3,243,000 | 3/1966 | Patton et al. | 252—8.5 X |
| 3,070,179 | 12/1962 | Moore | 252—8.5 X |
| 3,687,846 | 8/1972 | Lang | 252—8.8 |
| 3,663,477 | 5/1972 | Ahearn | 166—308 X |

HERBERT B. GUYNN, Primary Examiner

U.S. Cl. X.R.

166—307, 308; 252—8.55 R, 316